US012687693B2

(12) United States Patent
Chang et al.

(10) Patent No.: US 12,687,693 B2
(45) Date of Patent: Jul. 21, 2026

(54) PROJECTION LENS

(71) Applicant: Young Optics Inc., Hsinchu (TW)

(72) Inventors: Shuo-Chieh Chang, Hsinchu (TW);
Ching-Lung Lai, Hsinchu (TW);
Hsin-Te Chen, Hsinchu (TW);
Kuo-Chuan Wang, Hsinchu (TW)

(73) Assignee: Young Optics Inc., Hsinchu (TW)

( * ) Notice: Subject to any disclaimer, the term of this
patent is extended or adjusted under 35
U.S.C. 154(b) by 741 days.

(21) Appl. No.: 17/577,362

(22) Filed: Jan. 17, 2022

(65) Prior Publication Data

US 2022/0229268 A1      Jul. 21, 2022

(30) Foreign Application Priority Data

Jan. 19, 2021    (TW) ................................ 110101963

(51) Int. Cl.
 G02B 9/04      (2006.01)
 G02B 7/02      (2021.01)
 G02B 13/14      (2006.01)
 G02B 13/16      (2006.01)
 G02B 13/18      (2006.01)

(52) U.S. Cl.
 CPC .............. G02B 9/04 (2013.01); G02B 7/021
  (2013.01); G02B 13/16 (2013.01); **G02B
  13/18** (2013.01); *G02B 13/143* (2013.01)

(58) Field of Classification Search
 CPC ...... G02B 13/16; G02B 13/18; G02B 13/143;
   G02B 9/04; G02B 7/02; G02B 7/021;
   G02B 7/022; G02B 7/023; G02B 7/025;
   G02B 7/026
 See application file for complete search history.

(56) References Cited

U.S. PATENT DOCUMENTS

| | | | |
|---|---|---|---|
| 4,770,477 A | 9/1988 | Shafer | |
| 5,930,032 A | 7/1999 | Maruyama et al. | |
| 6,115,175 A | 9/2000 | Maruyama et al. | |
| 7,057,804 B2 | 6/2006 | Tada et al. | |
| 10,656,397 B2 | 5/2020 | Cheng et al. | |
| 2006/0193061 A1* | 8/2006 | Yoshitsugu .... | G02B 15/144113 |
| | | | 359/687 |

(Continued)

FOREIGN PATENT DOCUMENTS

| | | |
|---|---|---|
| CN | 1305115 | 7/2001 |
| CN | 102043229 | 5/2011 |

(Continued)

OTHER PUBLICATIONS

"Notice of allowance of China Counterpart Application", issued on
Jan. 29, 2026, p. 1-p. 4.

*Primary Examiner* — Ephrem Z Mebrahtu
(74) *Attorney, Agent, or Firm* — JCIPRNET

(57) ABSTRACT

The disclosure provides a projection lens including a first
lens set and a second lens set disposed sequentially from a
magnified side to a reduced side. The first lens set and the
second lens set are separated by a minimum inner diameter
of a lens barrel. The first lens set includes 4 to 6 spherical
lenses, and a refractive power of the first lens set is negative.
The second lens set includes 4 to 6 lenses, where one of the
lenses is an aspheric lens, and a refractive power of the
second lens set is positive. A transmittance of the projection
lens at a wavelength of 365 nm is greater than or equal to
75%.

14 Claims, 4 Drawing Sheets

100

(56)  References Cited

U.S. PATENT DOCUMENTS

| | | | | |
|---|---|---|---|---|
| 2008/0239514 | A1* | 10/2008 | Kawakami | G02B 13/04 |
| | | | | 359/744 |
| 2013/0141804 | A1* | 6/2013 | Liu | G02B 13/04 |
| | | | | 359/753 |
| 2013/0148213 | A1* | 6/2013 | Peng | G02B 13/18 |
| | | | | 359/717 |
| 2016/0377844 | A1* | 12/2016 | Cheng | G02B 13/143 |
| | | | | 359/355 |
| 2016/0377846 | A1* | 12/2016 | Lai | G02B 13/16 |
| | | | | 359/708 |
| 2017/0023781 | A1* | 1/2017 | Wang | G02B 15/1425 |
| 2018/0039043 | A1 | 2/2018 | Kim | |
| 2018/0224623 | A1* | 8/2018 | Lin | G02B 7/021 |
| 2020/0241246 | A1* | 7/2020 | Zhang | G02B 9/62 |
| 2022/0276472 | A1* | 9/2022 | Kamitakahara | G02B 13/16 |
| 2023/0065152 | A1* | 3/2023 | Lai | G02B 13/006 |

FOREIGN PATENT DOCUMENTS

| | | | | |
|---|---|---|---|---|
| CN | 102540412 | | 7/2012 | |
| CN | 103235401 | | 8/2013 | |
| CN | 103901584 | | 7/2014 | |
| CN | 107991760 B | * | 12/2020 | G02B 13/0015 |
| JP | 2012058607 | | 3/2012 | |
| TW | I410673 | | 10/2013 | |
| TW | 202011070 | | 3/2020 | |

* cited by examiner

PROJECTION LENS

CROSS-REFERENCE TO RELATED APPLICATION

This application claims the priority benefit of Taiwan applications serial no. 110101963, filed on Jan. 19, 2021. The entirety of the above-mentioned patent application is hereby incorporated by reference herein and made a part of this specification.

BACKGROUND

Technical Field

The disclosure relates to a lens, particularly to a fixed-focus projection lens.

Description of Related Art

Optical lenses are usually used for capturing or projecting images, so the adopted wavelength band is usually that of visible light or infrared light. However, with the advancement of technology, there are a growing number of products applying ultraviolet light, such as a 3D printer that uses an ultraviolet light source. Therefore, there is a need to develop an optical lens that provides good imaging or image-capture effects with less distortion.

SUMMARY

The present disclosure provides a projection lens capable of providing good optical effects in the ultraviolet wavelength band.

The projection lens according to an embodiment of the present disclosure includes a first lens set and a second lens set disposed in sequence from a magnified side to a reduced side. The first lens set and the second lens set are separated by a minimum inner diameter of a lens barrel. The first lens set includes 4 to 6 spherical lenses, and a refractive power of the first lens set is negative. The second lens set includes 4 to 6 lenses, where one of the lenses is an aspheric lens, and a refractive power of the second lens set is positive. A transmittance of the projection lens at a wavelength of 365 nm is greater than or equal to 75%.

The projection lens according to an embodiment of the present disclosure includes a first lens set and a second lens set disposed in sequence from a magnified side to a reduced side. The first lens set includes 3 to 5 spherical lenses, a refractive power of the first lens set is negative, and the first lens set is disposed in a first lens barrel. The second lens set includes an aspheric lens, and includes 5 to 7 lenses. A refractive power of the second lens set is positive, and the second lens set is disposed in a second lens barrel. A transmittance of the projection lens at a wavelength of 365 nm is greater than or equal to 75%.

Based on the above, since the transmittance of the projection lens of an embodiment of the present disclosure is greater than or equal to 75% at a wavelength of 365 nm, the projection lens is suitable for the ultraviolet wavelength band.

DESCRIPTION OF THE EMBODIMENTS

Figure 1:
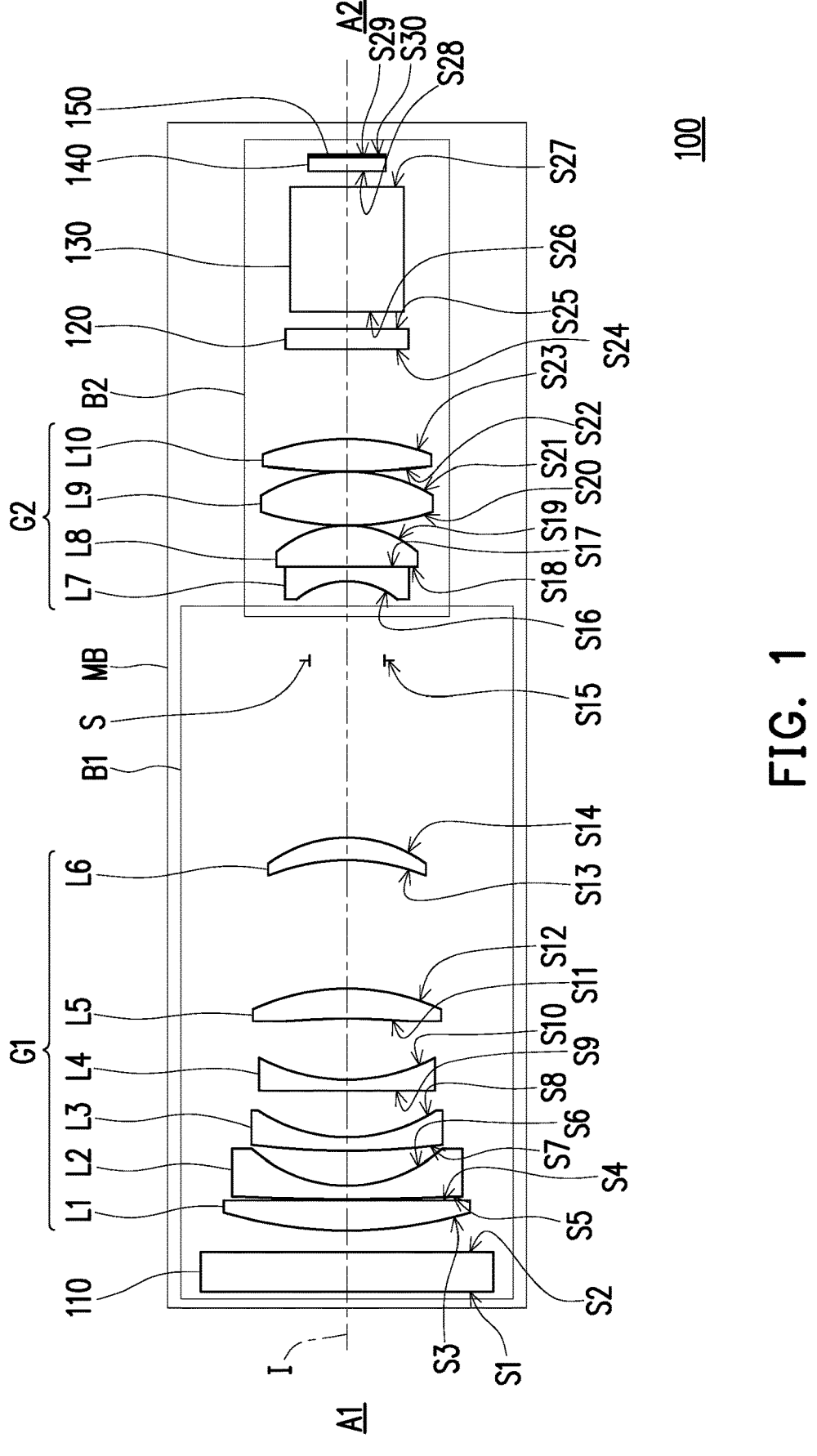
FIG. 1 is a schematic cross-sectional view of a projection lens according to a first embodiment of the disclosure.

FIG. 1 is a schematic cross-sectional view of a projection lens according to a first embodiment of the disclosure. Referring to FIG. 1, in this embodiment, a projection lens 100 includes a lens set G1 and a lens set G2 disposed in sequence from a magnified side A1 to a reduced side A2.

In this embodiment, the lens set G1 (which may be referred to as a first lens set) includes 4 to 6 spherical lenses, and a refractive power of the lens set G1 is negative. Specifically speaking, the lens set G1 includes a lens L1 (which may be referred to as a first lens), a lens L2 (which may be referred to as a second lens), a lens L3 (which may be referred to as a third lens), a lens L4 (which may be referred to as a fourth lens), a lens L5 (which may be referred to as a fifth lens), and a lens L6 (which may be referred to as a sixth lens) disposed in sequence from the magnified side A1 to the reduced side A2 along an optical axis I. The lenses L1 to L6 of the lens set G1 are all glass spherical lenses. In addition, the refractive powers of the lenses L1 to L6 are respectively positive, negative, negative, negative, positive, and positive.

Figure 4:
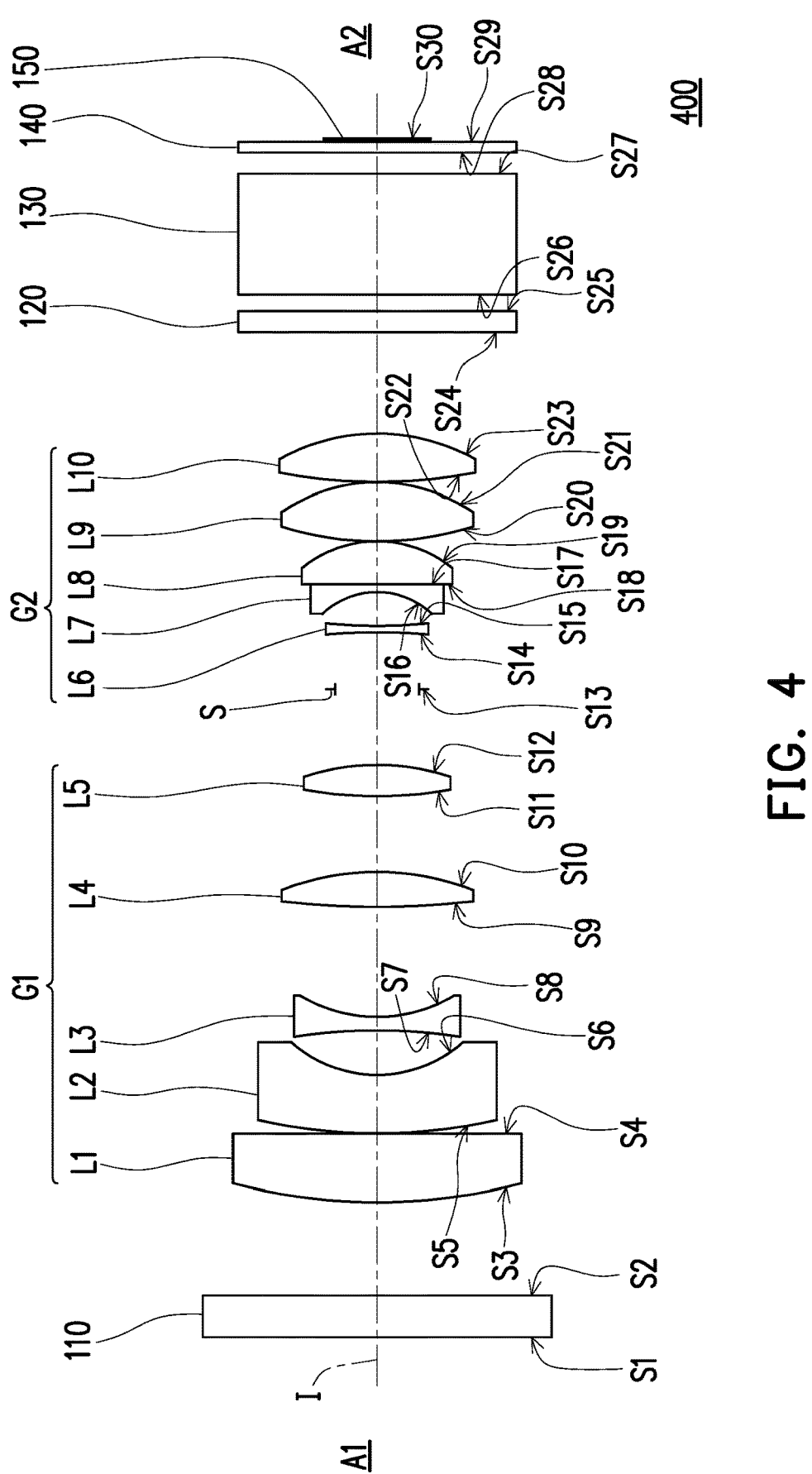
FIG. 4 is a schematic cross-sectional view of a projection lens according to a fourth embodiment of the disclosure.

In another embodiment, the lens set G1 may also include 3 to 5 spherical lenses, such as a projection lens 400 in FIG. 4.

In this embodiment, the lens set G2 (which may be referred to as a second lens set) includes 4 to 6 lenses. A refractive power of the lens set G2 is positive, and one of the lenses of the lens set G2 is an aspheric lens. Specifically speaking, the lens set G2 includes a lens L7 (which may be referred to as a seventh lens), a lens L8 (which may be referred to as an eighth lens), a lens L9 (which may be referred to as a ninth lens), and a lens L10 (which may be referred to as a tenth lens) disposed from the magnified side A1 to the reduced side A2 along the optical axis I. The lens L7 to the lens L9 of the lens set G2 are all glass spherical lenses. The lens L10 is configured as a glass aspheric lens to eliminate optical distortion. In addition, the refractive powers of the lens L7 to the lens L10 are respectively negative, positive, positive, and positive.

In another embodiment, the lens set G2 may also include 5 to 7 lenses, such as the projection lens 400 in FIG. 4.

In this embodiment, the lens set G1 is provided in a lens barrel B1 (which may be referred to as a first lens barrel), and the lens set G2 is provided in a lens barrel B2 (which may be referred to as a second lens barrel). The projection lens 100 further includes a main lens barrel MB, and the lens barrel B1 and the lens barrel B2 are disposed in the main lens barrel MB. Among the above configuration, the lens barrel B1 covers the lens barrel B2, and the main lens barrel MB covers the lens barrel B1 and the lens barrel B2. In addition, the lens set G1 and the lens set G2 are separated by a minimum inner diameter of a lens barrel. The minimum inner diameter of the lens barrel is, for example, the position of an aperture S between the lens L6 and the lens L7.

In one embodiment, the projection lens 100 includes ten lenses, whose refractive powers are positive, negative, negative, negative, positive, positive, negative, positive, positive, and positive in sequence from the magnified side A1 to the reduced side A2.

In this embodiment, since the projection lens 100 is configured to have a good optical effect in the ultraviolet wavelength band, the projection lens 100 preferably does not have a cemented lens. In other words, the distance between the lenses of the projection lens 100 is preferably maintained by mechanical components.

In this embodiment, a transmittance of the projection lens 100 at a wavelength of 365 nm is greater than or equal to 75%. Moreover, the material of each lens of the projection lens 100 has a transmittance greater than or equal to 80% at a wavelength of 365 nm and a thickness of 10 mm, such that the projection lens 100 is suitable for the ultraviolet wavelength band.

In this embodiment, the projection lens 100 satisfies the following conditional formula: $13 \leq TTL/H \leq 21$, where TTL is the total length of the projection lens 100, H is the image height of an imaging surface of the projection lens 100 on the reduced side A2, and the imaging surface is, for example, the position of the digital micromirror device (DMD) 150.

In this embodiment, the throw ratio of the projection lens 100, that is, the ratio of the distance (projection distance) between the projection lens 100 and the projection screen on the magnified side A1 to the width of the projection screen, is 1.0.

In this embodiment, the F-number (Fno) of the projection lens 100 is 2.2.

In this embodiment, the respective distances of the lens set G1 and the lens set G2 relative to an imaging surface on the reduced side A2 is variable.

In this embodiment, the optical distortion of the projection lens 100 is less than 0.25%.

In this embodiment, the effective focal length (EFL) of the projection lens 100 is greater than or equal to 8 and less than or equal to 14.

In this embodiment, the actual configuration of the aforementioned components is shown in Table 1 below.

TABLE 1

| Device | Surface | Radius of curvature (mm) | Distance (mm) | Refractive index (nd) | Abbe number (vd) |
|---|---|---|---|---|---|
| object | | 0.00E+00 | 1.23E+02 | | |
| cover glass 110 | S1 | 0.00E+00 | 4.35E+00 | 1.52 | 64.14 |
| | S2 | 0.00E+00 | 2.00E+00 | | |
| lens L1 | S3 | 5.34E+01 | 2.96E+00 | 1.65 | 39.68 |
| | S4 | Infinite | 1.00E−01 | | |
| lens L2 | S5 | 2.63E+02 | 1.37E+00 | 1.50 | 81.55 |
| | S6 | 1.69E+01 | 3.36E+00 | | |
| lens L3 | S7 | 1.64E+02 | 1.18E+00 | 1.50 | 81.55 |
| | S8 | 1.96E+01 | 4.60E+00 | | |
| lens L4 | S9 | Infinite | 1.08E+00 | 1.50 | 81.55 |
| | S10 | 2.38E+01 | 5.84E+00 | | |
| lens L5 | S11 | −1.86E+02 | 3.04E+00 | 1.73 | 51.47 |
| | S12 | −2.63E+01 | 1.26E+01 | | |
| lens L6 | S13 | −2.20E+01 | 2.04E+00 | 1.50 | 81.55 |
| | S14 | −1.67E+01 | 1.75E+01 | | |
| aperture S | S15 | Infinite | 7.61E+00 | | |
| lens L7 | S16 | −8.99E+00 | 1.50E+00 | 1.65 | 39.68 |
| | S17 | Infinite | 1.00E−03 | | |
| lens L8 | S18 | Infinite | 3.87E+00 | 1.50 | 81.55 |
| | S19 | −1.25E+01 | 1.00E−01 | | |
| lens L9 | S20 | 3.29E+01 | 5.29E+00 | 1.49 | 70.24 |
| | S21 | −2.18E+01 | 1.00E−01 | | |
| lens L10 | S22 | 6.85E+01 | 2.90E+00 | 1.51 | 64.03 |
| | S23 | −2.84E+01 | 8.81E+00 | | |
| TSP device 120 | S24 | Infinite | 2.00E+00 | 1.52 | 58.59 |
| | S25 | Infinite | 1.60E+00 | | |
| prism 130 | S26 | Infinite | 1.20E+01 | 1.52 | 64.17 |
| | S27 | Infinite | 2.00E+00 | | |
| cover glass 140 | S28 | Infinite | 1.10E+00 | 1.52 | 64.17 |
| | S29 | Infinite | 3.03E−01 | | |
| DMD 150 | S30 | Infinite | | | |

Please refer to FIG. 1 and Table 1 at the same time. Specifically speaking, in the projection lens 100 of this embodiment, the lens L1 has a surface S3 and a surface S4 from the magnified side A1 to the reduced side A2 in sequence, the lens L2 has a surface S5 and a surface S6 from the magnified side A1 to the reduced side A2 in sequence. And the rest may be deduced by analogy, so that the description of the surfaces corresponding to each device will not be repeated. Among the above configuration, a display surface of the aperture S and the DMD 150 are respectively represented by a surface S15 and a surface S30, and its radius of curvature is infinite (that is, a plane perpendicular to the optical axis I).

In addition, the distance in Table 1 is the distance between the surface to the next surface measured from the magnified side A1 to the reduced side A2. For example, the thickness of the lens L1 is 2.96E+00 mm, the distance between the lens L1 and the lens L2 is 1.00E-01 mm, the thickness of the lens L2 is 1.37E+00 mm, and the distance between the lens L2 and the lens L3 is 3.36E+00 mm, and so on.

Among them, the radius of the surface S3 of the lens L1 is positive, and the radius of the surface S4 of the lens L1 is 0, so the lens L1 is a plano-convex lens, where a positive radius means that the center of the representative surface shifts toward the magnified side A1, as the surface S3 do, and a negative radius means the center of the representative surface shifts toward the reduced side A2, as in the surface S11. And the radius of the surface S5 of the lens L2 is positive, the radius of the surface S6 of the lens L2 is positive, and the absolute value of the radius of the surface S5 of the lens L2 is smaller than the absolute value of the radius of the surface S6 of the lens L2. Therefore, the lens L2 is a negative meniscus lens having a concave surface facing the reduced side A2. By analogy, the lens L3 is a negative meniscus lens having a concave surface facing the reduced side A2; the lens L4 is a plano-concave lens; the lens L5 is a positive meniscus lens having a concave surface facing the magnified side A1; the lens L6 is a negative meniscus lens having a concave surface facing the magnified side A1; lens L7 is a plano-concave lens; lens L8 is a plano-convex lens; lens L9 is a double convex lens; and the lens L10 is a double convex lens.

In this embodiment, the total length of the projection lens 100 (TTL, the distance from the surface S3 of the lens L1 to the surface S23 of the lens L10) is 76.98 mm. The Field of View (FOV) of the projection lens 100 is 50.38 degrees, and the effective focal length (EFL) of the projection lens 100 is 8.37 mm.

In this embodiment, the distance between two lenses of the projection lens 100 is less than or equal to 0.01 mm, and the two lenses are non-cemented lenses. For example, the distance between the lens L7 and the lens L8 is 0.001 mm. Since the projection lens 100 is configured to have a good optical effect in the ultraviolet band, the two lenses with a distance of less than or equal to 0.01 mm between the projection lens 100 are non-cemented lenses, and it is preferable to maintain the distance between the two lenses with mechanical components.

Furthermore, in this embodiment, a digital micromirror device 150 with a smaller size may be selected, cooperating with a transmissive smooth picture (TSP) device 120 to replace the existing products of a higher specification to reduce the costs. The TSP device 120 is a flat plate, which makes the pixel points of the projected image bleed to a small extent through vibration, so as to prevent the graininess of the pixels from being observed by the user.

Table 2 below shows a quadric coefficient value K and various aspheric coefficients of the surface S22 and the surface S23 of the lens L10. The aspheric polynomial may be expressed by the following formula:

$$x = \frac{c' y^2}{1 + \sqrt{1 - (1 + K)c'^2 y^2}} + Ay^4 + $$
$$By^6 + Cy^8 + Dy^{10} + Ey^{12} + Fy^{14} + Gy^{16} + \ldots \quad (1)$$

Among the above formula, x is the sag in the direction of the optical axis I, and c' is the reciprocal of the radius of the osculating sphere, that is, the reciprocal of the radius of curvature close to the optical axis, k is the quadric coefficient, y is the height of the aspheric surface, which is the height measured from the center of the lens to the edge of the lens. A to G respectively represent the aspheric coefficients of each order of the aspheric polynomial.

TABLE 2

| | Aspheric coefficient | |
| --- | --- | --- |
| | Surface S22 | Surface S23 |
| K | −2.25E+01 | 3.26E+00 |
| A | −1.42E−05 | 3.92E−05 |
| B | −2.05E−07 | −1.41E−07 |
| C | 2.45E−09 | 3.83E−09 |
| D | −2.24E−12 | −1.25E−11 |
| E | −6.05E−14 | −1.21E−14 |

Based on the above, since the transmittance of the projection lens 100 at a wavelength of 365 nm is greater than or equal to 75% in an embodiment of the present disclosure, the projection lens 100 is suitable for the ultraviolet wavelength band. Furthermore, the lens set G2 includes an aspheric lens for eliminating optical distortion, so that the projection lens 100 provides good optical effects.

The projection lens of the second embodiment of the present disclosure is described below, and the actual configuration of each component is shown in Table 3 below.

TABLE 3

| Device | Sur-face | Radius of curvature (mm) | Distance (mm) | Refractive index (nd) | Abbe number (vd) |
| --- | --- | --- | --- | --- | --- |
| object | | Infinite | 1.26E+02 | | |
| cover glass 110 | S1 | Infinite | 4.10E+00 | 1.52 | 64.14 |
| | S2 | Infinite | 2.00E+00 | | |
| lens L1 | S3 | 4.91E+01 | 2.19E+00 | 1.52 | 64.14 |
| | S4 | 9.47E+02 | 1.00E−01 | | |
| lens L2 | S5 | 5.82E+01 | 1.22E+00 | 1.71 | 53.87 |
| | S6 | 1.55E+01 | 4.48E+00 | | |
| lens L3 | S7 | −4.44E+01 | 1.09E+00 | 1.50 | 81.55 |
| | S8 | 1.80E+01 | 9.21E+00 | | |
| lens L4 | S9 | −1.21E+02 | 2.47E+00 | 1.73 | 51.47 |
| | S10 | −2.51E+01 | 1.42E+01 | | |
| lens L5 | S11 | −2.30E+01 | 1.41E+00 | 1.52 | 58.90 |
| | S12 | −1.68E+01 | 1.72E+01 | | |
| aperture S | S13 | Infinite | 7.62E+00 | | |
| lens L6 | S14 | −8.69E+00 | 2.68E+00 | 1.52 | 64.14 |
| | S15 | −5.66E+02 | 0.01 | | |
| lens L7 | S16 | −6.49E+02 | 2.77E+00 | 1.50 | 81.55 |
| | S17 | −1.53E+01 | 1.00E−01 | | |
| lens L8 | S18 | 3.48E+01 | 4.65E+00 | 1.50 | 81.55 |
| | S19 | −1.82E+01 | 1.00E−01 | | |
| lens L9 | S20 | 7.74E+01 | 2.87E+00 | 1.51 | 64.03 |
| | S21 | −2.46E+01 | 9.30E+00 | | |

TABLE 3-continued

| Device | Sur-face | Radius of curvature (mm) | Distance (mm) | Refractive index (nd) | Abbe number (vd) |
| --- | --- | --- | --- | --- | --- |
| TSP device 120 | S22 | Infinite | 2.00E+00 | 1.52 | 58.59 |
| | S23 | Infinite | 1.60E+00 | | |
| prism 130 | S24 | Infinite | 1.20E+01 | 1.52 | 64.17 |
| | S25 | Infinite | 2.00E+00 | | |
| cover glass 140 | S26 | Infinite | 1.10E+00 | 1.52 | 64.17 |
| | S27 | Infinite | 3.03E−01 | | |
| DMD 150 | S28 | Infinite | | | |

Figure 2:
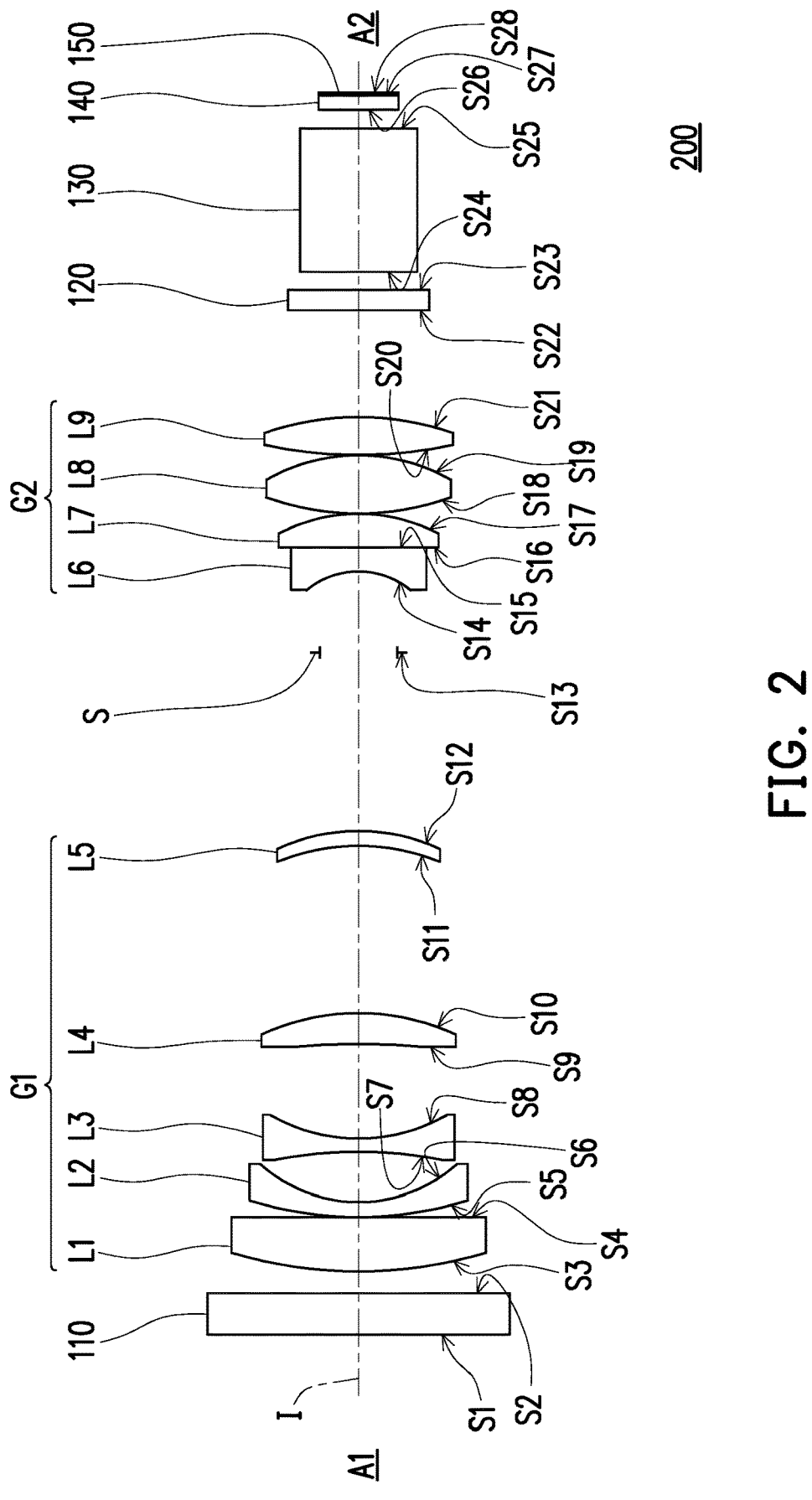
FIG. 2 is a schematic cross-sectional view of the projection lens of a second embodiment of the disclosure.

FIG. 2 is a schematic cross-sectional view of the projection lens of a second embodiment of the disclosure. Please refer to FIG. 2 and Table 3 at the same time. In this embodiment, a projection lens 200 includes nine lenses, whose refractive powers are positive, negative, negative, positive, positive, negative, positive, positive, and positive in sequence from a magnified side A1 to a reduced side A2. In addition, an aperture S is provided between a lens L5 and a lens L6.

In this embodiment, a lens L1 is a positive meniscus lens with a concave surface facing the reduced side A2; a lens L2 is a negative meniscus lens with a concave surface facing the reduced side A2; a lens L3 is a biconcave lens; a lens L4 is a positive meniscus lens with a concave surface facing the magnified side A1; the lens L5 is a positive meniscus lens with a concave surface facing the magnified side A1; the lens L6 is a negative meniscus lens with a concave surface facing the magnified side A1; a lens L7 is a positive meniscus lens with a concave surface facing the magnified side A1; a lens L8 is a double convex lens; and a lens L9 is a double convex lens.

It is worth mentioning that, in the embodiment in Table 3, the total length of the projection lens 200 is 74.47 mm (which is the sum of the distances from a surface S3 to a surface S21 in Table 3). The viewing angle of the projection lens 200 is 50.37 degrees, and the effective focal length of the projection lens 200 is 8.37 mm.

Table 4 below shows the quadric coefficient value K and various aspheric coefficients of a surface S20 and the surface S21 of the lens L9. Please refer to the above formula (1) for the aspheric equation.

TABLE 4

| | Aspheric coefficient | |
| --- | --- | --- |
| | Surface S20 | Surface S21 |
| K | −1.74E+01 | 1.02E+00 |
| A | −1.61E−06 | 6.34E−05 |
| B | −7.19E−08 | −5.31E−08 |
| C | 3.77E−09 | 5.21E−09 |
| D | 2.34E−12 | −7.23E−12 |
| E | −6.74E−14 | −1.90E−14 |

The projection lens of the third embodiment of the present disclosure is described below, and the actual configuration of each component is shown in Table 5 below.

TABLE 5

| Device | Sur-face | Radius of curvature (mm) | Distance (mm) | Refractive index (nd) | Abbe number (vd) |
| --- | --- | --- | --- | --- | --- |
| object | | Infinite | 1.14E+02 | | |
| cover glass 110 | S1 | Infinite | 4.45E+00 | 1.52 | 58.59 |
| | S2 | Infinite | 9.02E+00 | | |

TABLE 5-continued

| Device | Surface | Radius of curvature (mm) | Distance (mm) | Refractive index (nd) | Abbe number (vd) |
|---|---|---|---|---|---|
| lens L1 | S3 | 6.21E+01 | 7.00E+00 | 1.80 | 46.53 |
|  | S4 | 4.40E+02 | 1.00E−01 |  |  |
| lens L2 | S5 | 7.60E+01 | 6.52E+00 | 1.73 | 54.68 |
|  | S6 | 1.63E+01 | 3.78E+00 |  |  |
| lens L3 | S7 | −5.31E+01 | 1.00E+00 | 1.73 | 54.68 |
|  | S8 | 2.21E+01 | 1.04E+01 |  |  |
| lens L4 | S9 | 1.44E+02 | 3.28E+00 | 1.77 | 49.60 |
|  | S10 | −3.45E+01 | 1.44E+01 |  |  |
| lens L5 | S11 | 4.85E+01 | 2.45E+00 | 1.50 | 81.61 |
|  | S12 | −3.27E+01 | 6.32E+00 |  |  |
| aperture S | S13 | Infinite | 6.93E+00 |  |  |
| lens L6 | S14 | −5.28E+01 | 8.00E−01 | 1.61 | 44.27 |
|  | S15 | 8.09E+01 | 2.37E+00 |  |  |
| lens L7 | S16 | −1.00E+01 | 8.50E−01 | 1.67 | 38.15 |
|  | S17 | Infinite | 1.00E−03 |  |  |
| lens L8 | S18 | Infinite | 3.84E+00 | 1.50 | 81.61 |
|  | S19 | −1.52E+01 | 1.00E−01 |  |  |
| lens L9 | S20 | 5.82E+01 | 4.76E+00 | 1.50 | 81.61 |
|  | S21 | −2.35E+01 | 1.00E−01 |  |  |
| lens L10 | S22 | 4.54E+01 | 5.22E+00 | 1.51 | 63.75 |
|  | S23 | −2.25E+01 | 9.21E+00 |  |  |
| TSP device 120 | S24 | Infinite | 2.00E+00 | 1.52 | 58.59 |
|  | S25 | Infinite | 1.60E+00 |  |  |
| prism 130 | S26 | Infinite | 1.20E+01 | 1.52 | 64.17 |
|  | S27 | Infinite | 2.00E+00 |  |  |
| cover glass 140 | S28 | Infinite | 1.10E+00 | 1.52 | 64.17 |
|  | S29 | Infinite | 3.03E−01 |  |  |
| DMD 150 | S30 | Infinite |  |  |  |

Figure 3:
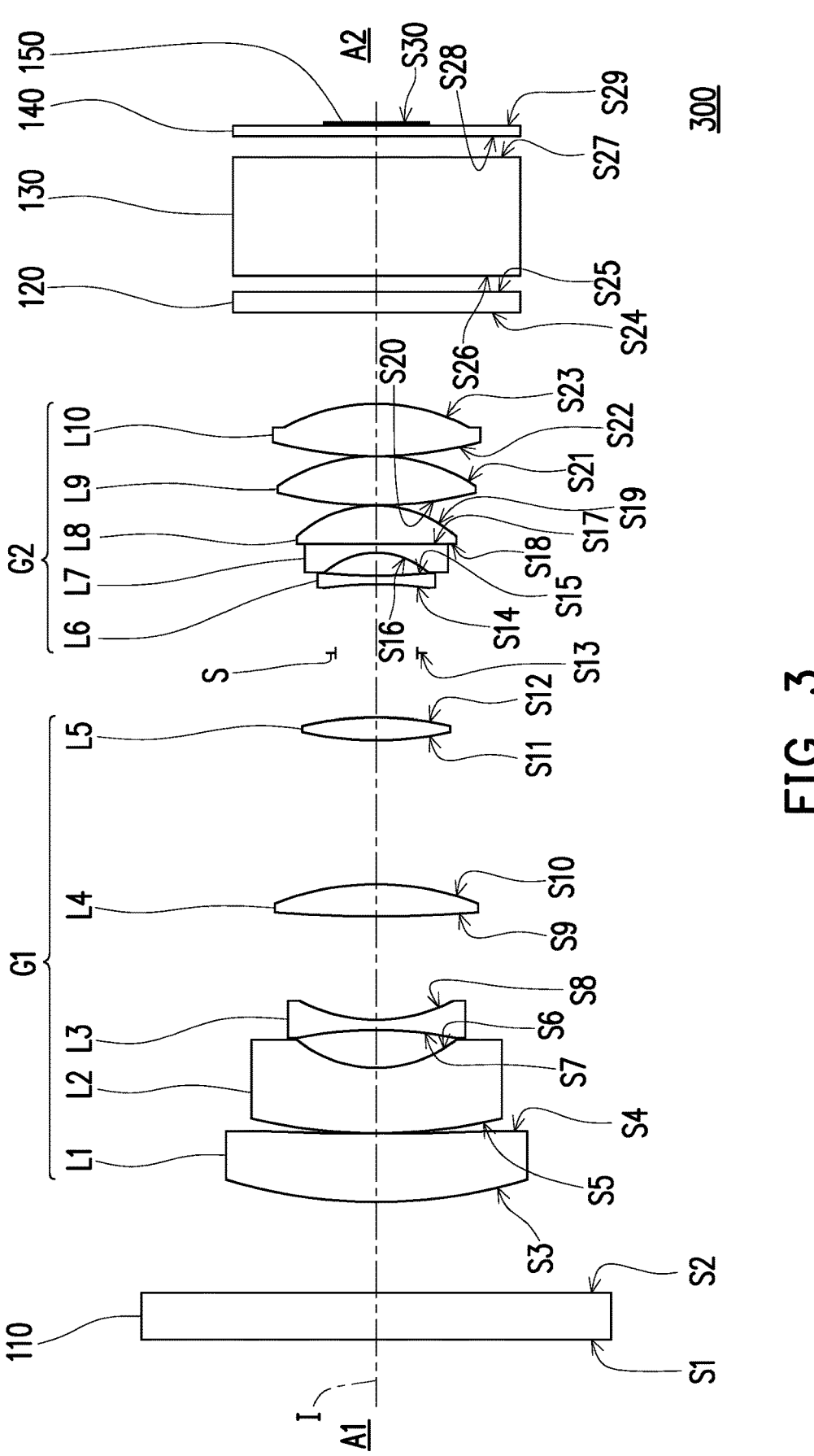
FIG. 3 is a schematic cross-sectional view of a projection lens according to a third embodiment of the disclosure.

FIG. 3 is a schematic cross-sectional view of a projection lens according to a third embodiment of the disclosure. Please refer to FIG. 3 and Table 5 at the same time. In this embodiment, a projection lens 300 includes ten lenses, whose refractive powers are positive, negative, negative, positive, positive, negative, negative, positive, positive, and positive in sequence from a magnified side A1 to a reduced side A2. In addition, an aperture S is provided between a lens L5 and a lens L6. The distance between a lens L7 and a lens L8 is 0.001 mm.

In this embodiment, a lens L1 is a positive meniscus lens on the concave reduced side A2; a lens L2 is a negative meniscus lens having a concave surface facing the reduced side A2; a lens L3 is a biconcave lens; a lens L4 is a double convex lens; the lens L5 is a double convex lens; the lens L6 is a biconcave lens; the lens L7 is a plano-concave lens; the lens L8 is a plano-convex lens; a lens L9 is a double convex lens; a lens L10 is a double convex lens.

It is worth mentioning that, in the embodiment of Table 5, the total length of the projection lens 300 is 80.26 mm (which is the sum of the distances from the surface S3 to the surface S23 in Table 5). The angle of view of the projection lens 300 is 48.00 degrees, and the effective focal length of the projection lens 300 is 13.00 mm.

Table 6 below shows the quadric coefficient value K and various aspheric coefficients of a surface S22 and the surface S23 of the lens L10. Please refer to the above formula (1) for the aspheric equation.

TABLE 6

| | Aspheric coefficient | |
|---|---|---|
| | Surface S20 | Surface S21 |
| K | −7.09E+00 | −3.95E+00 |
| A | −7.13E−06 | −1.44E−05 |
| B | −1.52E−07 | −1.23E−07 |

TABLE 6-continued

| | Aspheric coefficient | |
|---|---|---|
| | Surface S20 | Surface S21 |
| C | 5.53E−09 | 6.76E−09 |
| D | −1.05E−10 | −1.27E−10 |
| E | 1.12E−12 | 1.30E−12 |
| F | −5.94E−15 | −6.74E−15 |
| G | 1.27E−17 | 1.41E−17 |

The projection lens of the fourth embodiment of the present disclosure is described below, and the actual configuration of each component is shown in Table 7 below.

TABLE 7

| Device | Surface | Radius of curvature (mm) | Distance (mm) | Refractive index (nd) | Abbe number (vd) |
|---|---|---|---|---|---|
| object | | Infinite | 3.37E+01 |  |  |
| cover glass 110 | S1 | Infinite | 7.12E+00 | 1.52 | 58.59 |
|  | S2 | Infinite | 6.35E+00 |  |  |
| lens L1 | S3 | 7.32E+01 | 7.00E+00 | 1.80 | 46.53 |
|  | S4 | Infinite | 1.00E−01 |  |  |
| lens L2 | S5 | 9.56E+01 | 5.69E+00 | 1.73 | 54.68 |
|  | S6 | 1.53E+01 | 4.46E+00 |  |  |
| lens L3 | S7 | −6.34E+01 | 1.28E+00 | 1.73 | 54.68 |
|  | S8 | 1.94E+01 | 1.09E+01 |  |  |
| lens L4 | S9 | 9.80E+01 | 3.41E+00 | 1.77 | 49.60 |
|  | S10 | −3.51E+01 | 8.02E+00 |  |  |
| lens L5 | S11 | 8.13E+01 | 2.70E+00 | 1.50 | 81.61 |
|  | S12 | −2.94E+01 | 7.65E+00 |  |  |
| aperture S | S13 | Infinite | 5.60E+00 |  |  |
| lens L6 | S14 | −7.41E+01 | 8.00E−01 | 1.61 | 44.27 |
|  | S15 | 7.41E+01 | 3.28E+00 |  |  |
| lens L7 | S16 | −9.91E+00 | 8.76E−01 | 1.67 | 38.15 |
|  | S17 | Infinite | 1.00E−03 |  |  |
| lens L8 | S18 | Infinite | 4.05E+00 | 1.50 | 81.61 |
|  | S19 | −1.51E+01 | 1.50E−01 |  |  |
| lens L9 | S20 | 4.09E+01 | 5.70E+00 | 1.50 | 81.61 |
|  | S21 | −2.30E+01 | 2.00E−01 |  |  |
| lens L10 | S22 | 5.91E+01 | 4.61E+00 | 1.51 | 63.75 |
|  | S23 | −2.46E+01 | 1.05E+01 |  |  |
| TSP device 120 | S24 | Infinite | 2.00E+00 | 1.52 | 58.59 |
|  | S25 | Infinite | 1.60E+00 |  |  |
| prism 130 | S26 | Infinite | 1.20E+01 | 1.52 | 64.17 |
|  | S27 | Infinite | 2.00E+00 |  |  |
| cover glass 140 | S28 | Infinite | 1.10E+00 | 1.52 | 64.17 |
|  | S29 | Infinite | 3.03E−01 |  |  |
| DMD 150 | S30 | Infinite |  |  |  |

FIG. 4 is a schematic cross-sectional view of a projection lens according to a fourth embodiment of the disclosure. Pease refer to FIG. 4 and Table 7 at the same time. In this embodiment, a projection lens 400 includes ten lenses, whose refractive powers are positive, negative, negative, positive, positive, negative, negative, positive, positive, and positive in sequence from a magnified side A1 to a reduced side A2. In addition, an aperture S is provided between a lens L5 and a lens L6. The distance between a lens L7 and a lens L8 is 0.001 mm.

In this embodiment, a lens L1 is a plano-convex lens; a lens L2 is a negative meniscus lens having a concave surface facing the reduced side A2; a lens L3 is a biconcave lens; a lens L4 is a double convex lens; the lens L5 is a double convex lens; the lens L6 is a biconcave lens; the lens L7 is a plano-concave lens; the lens L8 is a plano-convex lens; a lens L9 is a double convex lens; a lens L10 is a double convex lens.

In the embodiment of Table 7, the total length of the projection lens 400 is 76.51 mm (which is the sum of the distances from a surface S3 to a surface S23 in Table 7). The viewing angle of the projection lens 400 is 50.08 degrees, and the effective focal length of the projection lens 400 is 12.7 mm.

Table 8 below shows the quadric coefficient value K and various aspheric coefficients of a surface S22 and the surface S23 of the lens L10. Please refer to the above formula (1) for the aspheric equation.

TABLE 8

| | Aspheric coefficient | |
| --- | --- | --- |
| | Surface S20 | Surface S21 |
| K | −2.41E+01 | −5.03E+00 |
| A | −5.25E−06 | −1.53E−05 |
| B | −2.11E−07 | −2.05E−07 |
| C | 5.05E−09 | 8.45E−09 |
| D | −7.27E−11 | −1.29E−10 |
| E | 4.55E−13 | 9.61E−13 |
| F | −2.28E−16 | −2.64E−15 |
| G | −5.61E−18 | −7.70E−19 |

In some embodiments of the present disclosure, the F-number of the projection lens is >2.2, and the optical distortion is <0.25%, preferably. In the lens structure, a single lens has a transmittance of >80% under the irradiation of light at a wavelength of 365 nm, the lens has no cemented lens, and the distance of the first lens set and the second lens set relative to the imaging surface on the reduced side of the lens is variable.

In sum, since the transmittance of the projection lens of an embodiment of the present disclosure is greater than or equal to 75% at a wavelength of 365 nm, the projection lens is suitable for the ultraviolet wavelength band. Furthermore, as the second lens set includes an aspheric lens for eliminating optical distortion, the projection lens provides good optical effects.

Although the present disclosure is described with the above embodiments, it is possible for a person with ordinary knowledge in this technical field to make modifications without changing the essential conditions. For example, replace one lens with high curvature and large thickness with two lenses to increase the feasibility of manufacturing, or reduce the two lenses to one lens to reduce the size and costs. Therefore, those skilled in the art can adjust the number of lenses in the present disclosure in general without changing the essential conditions, and the number is not limited to the number of lenses shown in the embodiments. The number of lenses mentioned in the claims may be modified or replaced by those with general, common knowledge in the art with equivalent alternatives or obvious modifications that can be reasonably anticipated from the embodiments of the specification to have the same performances or purposes. The scope of protection of the disclosure shall still depend on the content of the claims.

What is claimed is:

1. A projection lens, comprising:

a first lens set and a second lens set, disposed in sequence from a magnified side to a reduced side, wherein:

the first lens set and the second lens set are separated by a minimum inner diameter of a lens barrel;

the first lens set comprises 4 to 6 spherical lenses, and a refractive power of the first lens set is negative;

the second lens set comprises 4 to 6 lenses, one of the lenses is an aspheric lens, and a refractive power of the second lens set is positive; and the projection lens comprises a transmittance greater than or equal to 75% at a wavelength of 365 nm, wherein an effective focal length of the projection lens is greater than or equal to 8 and less than or equal to 14, wherein a total length of the projection lens is fixed, the effective focal length of the projection lens is fixed, and a zoom ratio of the projection lens is substantially equal to 1, wherein the projection lens does not comprise a cemented lens, wherein a distance between two lenses of the projection lens is between 0.001 to 0.01 mm, wherein the projection lens does not comprise an infrared filter.

2. A projection lens comprising a first lens set and a second lens set disposed in sequence from a magnified side to a reduced side, wherein the first lens set comprises 3 to 5 spherical lenses, a refractive power of the first lens set is negative, and the first lens set is disposed in a first lens barrel;

the second lens set comprises an aspheric lens and comprises 5 to 7 lenses, a refractive power of the second lens set is positive, and the second lens set is disposed in a second lens barrel; and the projection lens comprises a transmittance greater than or equal to 75% at a wavelength of 365 nm, wherein an effective focal length of the projection lens is greater than or equal to 8 and less than or equal to 14, wherein a total length of the projection lens is fixed, the effective focal length of the projection lens is fixed, and a zoom ratio of the projection lens is substantially equal to 1, wherein the projection lens does not comprise a cemented lens, wherein a distance between two lenses of the projection lens is between 0.001 to 0.01 mm, wherein the projection lens does not comprise an infrared filter.

3. The projection lens according to claim 2, wherein the first lens set is disposed in the first lens barrel, the second lens set is disposed in the second lens barrel, and the second lens barrel is covered by the first lens barrel.

4. The projection lens according to claim 3, further comprising a main lens barrel, and the first lens barrel and the second lens barrel are disposed in the main lens barrel.

5. The projection lens according to claim 2, wherein the projection lens comprises ten lenses, and the ten lenses meet one of the following conditions: (1) refractive powers of the ten lenses are positive, negative, negative, negative, positive, positive, negative, positive, positive, and positive in sequence from the magnified side to the reduced side; or (2) refractive powers of the ten lenses are positive, negative, negative, positive, positive, negative, negative, positive, positive, and positive in sequence from the magnified side to the reduced side.

6. The projection lens according to claim 2, wherein the projection lens comprises nine lenses, and refractive powers of the nine lenses are positive, negative, negative, positive, positive, negative, positive, positive, and positive in sequence from the magnified side to the reduced side.

7. The projection lens according to claim 2, wherein distances of the first lens set and the second lens set of the projection lens relative to an imaging surface on the reduced side of the projection lens is variable.

8. The projection lens according to claim 2, wherein lenses of the first lens set are all glass spherical lenses.

9. The projection lens according to claim 2, wherein lenses of the projection lens are all glass lenses.

10. The projection lens according to claim 2, wherein the projection lens satisfies a conditional formula as follow: 13≤TTL/H≤21, wherein TTL is the total length of the projection lens, and His an image height of an imaging surface of the projection lens on the reduced side.

11. The projection lens according to claim 2, wherein a throw ratio of the projection lens is 1.0.

12. The projection lens according to claim 2, wherein an F-number of the projection lens is 2.2.

13. The projection lens according to claim 2, wherein an optical distortion of the projection lens is less than 0.25%.

14. The projection lens according to claim 2, wherein a material of each lens of the projection lens comprises a transmittance greater than or equal to 80% at a wavelength of 365 nm and a thickness of 10 mm.

* * * * *